United States Patent
Yin

(10) Patent No.: US 8,260,368 B2
(45) Date of Patent: Sep. 4, 2012

(54) MOBILE PHONE AND METHOD FOR AUTOMATICALLY SWITCHING BETWEEN INCOMING CALL ALERT MODES OF MOBILE PHONE

(75) Inventor: Ming Yin, Shanghai (CN)

(73) Assignee: Inventec Appliances Corp., Taipei Hsien (TW)

( * ) Notice: Subject to any disclaimer, the term of this patent is extended or adjusted under 35 U.S.C. 154(b) by 430 days.

(21) Appl. No.: 12/628,174

(22) Filed: Nov. 30, 2009

(65) Prior Publication Data

US 2010/0167794 A1      Jul. 1, 2010

(30) Foreign Application Priority Data

Dec. 25, 2008   (TW) .............................. 97150670 A

(51) Int. Cl.
 *H04M 1/00* (2006.01)
(52) U.S. Cl. ..... 455/567; 455/418; 455/90.1; 455/414.1
(58) Field of Classification Search .................. 455/567, 455/414.1, 414.2, 412.2, 415, 418, 67.11, 455/566, 550.1, 552.1, 90.1, 419; 340/689, 340/692

See application file for complete search history.

(56) References Cited

U.S. PATENT DOCUMENTS

| | | | |
|---|---|---|---|
| 2007/0037605 A1* | 2/2007 | Logan | 455/567 |
| 2008/0045207 A1* | 2/2008 | Ahn et al. | 455/428 |
| 2011/0028190 A1* | 2/2011 | Mizuta et al. | 455/575.3 |

* cited by examiner

*Primary Examiner* — John J Lee
(74) *Attorney, Agent, or Firm* — CKC & Partners Co., Ltd.

(57) ABSTRACT

A mobile phone and a method for automatically switching between incoming call alert modes of the mobile phone are provided. The mobile phone comprises a body, a control unit, a receiver and a sensor. The control unit disposed in the body includes an incoming call alert control module providing several incoming call alert modes. The receiver and the sensor are electrically connected to the control unit. The receiver suitable for receiving an incoming call signal transmits the incoming call signal to the control unit. The sensor suitable for sensing an included angle between a lengthwise axis of the mobile phone and a level transmits a signal comprising the data of the included angle to the control unit. When the control unit receives the signal of the detected included angle, the incoming call alert control module enters one of the incoming call alert modes according to the detected included angle.

13 Claims, 4 Drawing Sheets

MOBILE PHONE AND METHOD FOR AUTOMATICALLY SWITCHING BETWEEN INCOMING CALL ALERT MODES OF MOBILE PHONE

RELATED APPLICATIONS

This application claims priority to Taiwan Application Serial Number 97150670, filed Dec. 25, 2008, which is herein incorporated by reference.

FIELD OF THE INVENTION

The present invention relates to a mobile phone, and more particularly to a mobile phone can automatically enter one of the incoming call alert modes according to the included angle between the lengthwise axis of the mobile phone and the level.

BACKGROUND OF THE INVENTION

Currently, the incoming call alert of a typical mobile phone usually includes a ringing mode, a vibration mode, a flashing alert mode and a silent mode. The user can switch the incoming call alert of the mobile phone by oneself according to the requirements of different occasions.

For example, when the user is on a quieter indoor place, the incoming call alert of the mobile phone is usually switched to an indoor ringing mode with lower volume or a vibration mode. On occasions when the user doesn't want to be disturbed by the incoming call of the mobile phone, such as in the conference, the incoming call alert of the mobile phone is even switched to the absolutely quiet incoming call alert mode, such as a flashing alert mode or a silent alert mode. However, when the user is in a noisier outdoor occasion, the incoming call alert of the mobile phone is usually switched to an outdoor ringing mode with higher volume or an outdoor ringing and vibration mode to prevent from missing the incoming call.

A typical user may usually be in various environments, such as a quiet work environment, a conference environment, a movie house and a noisy outdoor environment, so that the occasion where the user is may be changed frequently. Therefore, it is very troublesome and inconvenient for the user to switch the incoming call alert of the mobile phone constantly as the frequently changing occasions demand. Furthermore, the user may miss an important incoming call or the mobile phone may ring a mistimed incoming call alert on a quiet occasion because the user forgets to switch the incoming call alert of the mobile phone.

Therefore, a mobile phone, which can automatically switch its incoming call alert, is needed to increase the practicality and the convenience of the mobile phone.

SUMMARY OF THE INVENTION

Therefore, one aspect of the present invention is to provide a mobile phone, which is equipped with a sensor. The sensor can sense an included angle between a lengthwise axis of the mobile phone and a level, so that a control unit of the mobile phone can automatically enter one of the incoming call alert modes according to the detected included angle. Accordingly, it can prevent the user in the outdoors from missing the important incoming call. Furthermore, it can prevent the mobile phone from ringing inappropriately on a quiet occasion because the user forgot to change the incoming call alert of the mobile phone.

Another aspect of the present invention is to provide a method for automatically switching between a plurality of incoming call alert modes of a mobile phone, which can use a sensor of the mobile phone to sense an included angle between a lengthwise axis of the mobile phone and a level, can use a control unit of the mobile phone to determine orientation of the mobile phone according to the detected included angle, and can automatically enter one of the incoming call alert modes according to a determination of the orientation of the mobile phone. Therefore, the incoming call alert of the mobile phone can meet the requirements of the user, and the user does not need to switch the incoming call alert mode according to the occasion by oneself, thereby greatly increasing the practicality and the convenience of the mobile phone.

According to the aforementioned aspects, the present invention provides a mobile phone. The mobile phone comprises a body, a control unit, a receiver and a sensor. The control unit is disposed in the body, wherein the control unit includes an incoming call alert control module providing a plurality of incoming call alert modes. The receiver is suitable for receiving an incoming call signal and transmitting the incoming call signal to the control unit, wherein the receiver is disposed in the body and is electrically connected to the control unit. The sensor is suitable for sensing an included angle between a lengthwise axis of the mobile phone and a level, and for transmitting a signal of the detected included angle to the control unit, wherein the sensor is disposed in the body and is electrically connected to the control unit. When the control unit receives the incoming call signal, the control unit activates the sensor. When the control unit receives the signal of the detected included angle, the incoming call alert control module enters one of the incoming call alert modes according to the detected included angle.

According to one embodiment of the present invention, the sensor is a gravity sensor or a motion sensor.

According to the aforementioned aspects, the present invention provides a method for automatically switching between a plurality of incoming call alert modes of a mobile phone. The mobile phone includes a sensor and a plurality of incoming call alert modes. The method comprises the following steps. The sensor is activated when an incoming call signal is received. An included angle between a lengthwise axis of the mobile phone and a level is sensed. An orientation of the mobile phone is determined according to the detected included angle. One of the incoming call alert modes is entered by the mobile phone according to a determination of the orientation of the mobile phone.

According to one embodiment of the present invention, when the detected included angle between the lengthwise axis of the mobile phone and the level is substantially 90 degrees, the determination is that the mobile phone is oriented in a vertical direction. Therefore, the step of the mobile phone entering one of the incoming call alert modes comprises the mobile phone entering an outdoor ringing alert mode.

According to another embodiment of the present invention, when the detected included angle between the lengthwise axis of the mobile phone and the level is substantially 0 degrees, the determination is that the mobile phone is oriented in a horizontal direction. The step of the mobile phone entering one of the incoming call alert modes comprises the mobile phone entering a vibration alert mode, the indoor ringing alert mode, the flashing alert mode or the indoor ringing and vibration alert mode.

BRIEF DESCRIPTION OF THE DRAWINGS

The foregoing aspects and many of the attendant advantages of this invention are more readily appreciated as the same become better understood by reference to the following detailed description, when taken in conjunction with the accompanying drawings, wherein.

DETAILED DESCRIPTION OF THE PREFERRED EMBODIMENT

The present invention discloses a mobile phone and a method for automatically switching between a plurality of incoming call alert modes of a mobile phone. The incoming call alert mode of a mobile phone can be automatically switched according to orientations of the mobile phone. Therefore, it can prevent the user from missing the incoming call of the mobile phone or it can prevent the mobile phone from ringing a mistimed incoming call alert, thereby greatly increasing the practicality and the convenience of the mobile phone. In order to make the illustration of the present invention more explicit, the following description is stated with reference to FIG. 1 through 3.

Figure 1:
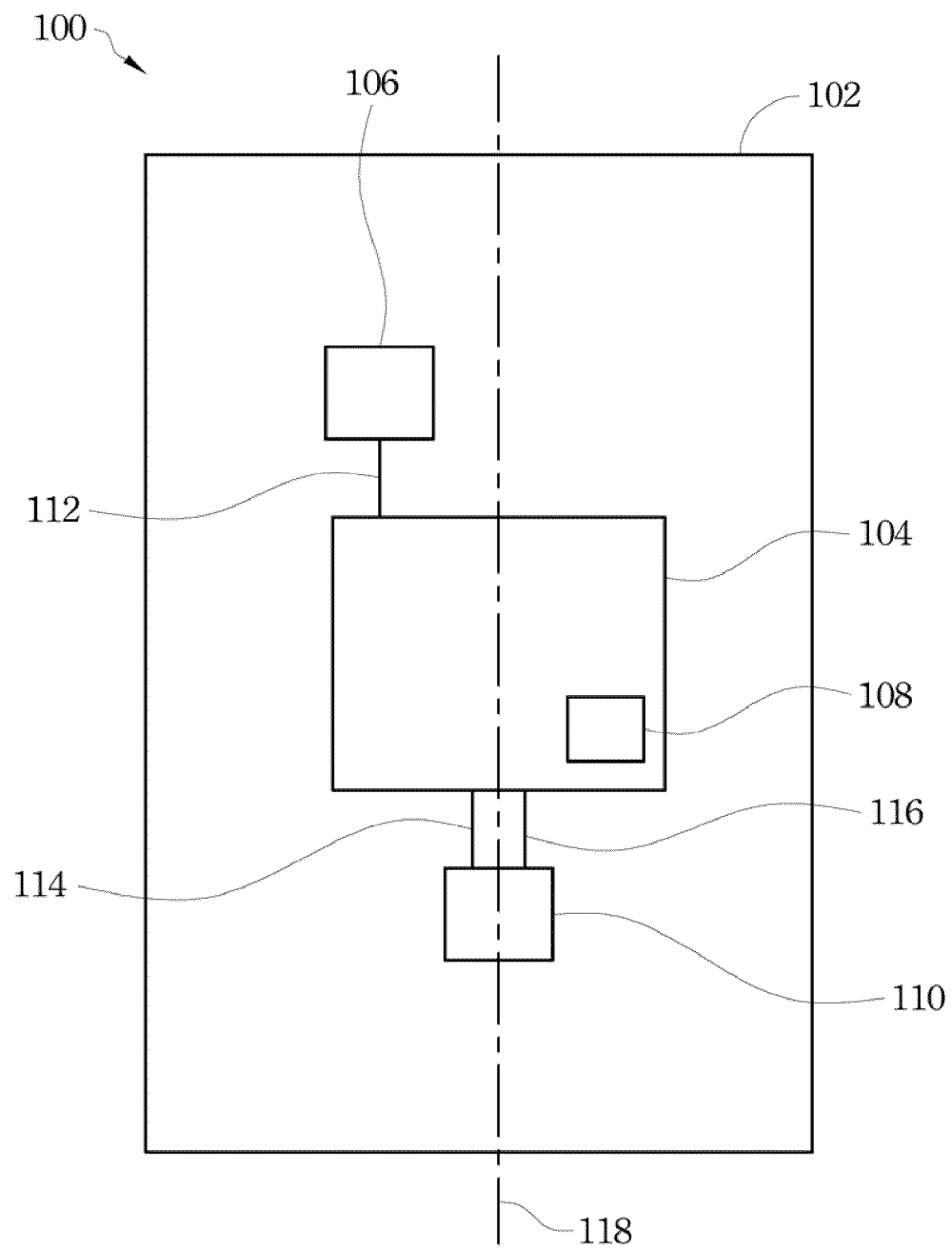
FIG. 1 is a schematic diagram showing the assembly of a mobile phone in accordance with a preferred embodiment of the present invention.

Refer to FIG. 1. FIG. 1 is a schematic diagram showing the assembly of a mobile phone in accordance with a preferred embodiment of the present invention. In one exemplary embodiment, a mobile phone 100 can automatically enter one of the incoming call alert modes according to the detected included angle. The mobile phone 100 includes a body 102, a control unit 104, a receiver 106 and a sensor 110, wherein the control unit 104, the receiver 106 and the sensor 110 may be all disposed in the inner of the body 102. Typically, the body 102 may include a display module, a keyboard module, a sound receiver module or a sound-broadcasting module, for example. The mobile phone 100 has a lengthwise axis 118, wherein the lengthwise axis 118 vertically extends in a lengthwise direction of the body 102 of the mobile phone 100.

In one embodiment, the control unit 102 may include a incoming call alert control module 108. The incoming call alert control module 108 is usually preset with a plurality of incoming call alert modes, including an outdoor ringing alert mode, an indoor ringing alert mode, a vibration alert mode, a silent alert mode, a flashing alert mode, an indoor ringing and vibration alert mode and an outdoor ringing and vibration alert mode, for example. The mobile phone 100 can enter one of the incoming call alert modes by operating the incoming call alert control module 108. Typically, the main difference between the outdoor ringing alert mode and the indoor ringing alert mode is that the telephone ring of the outdoor ringing alert mode is much louder than that of the indoor ringing alert mode. In addition, both the indoor ringing and vibration alert mode and the outdoor ringing and vibration alert mode in these incoming call alert modes represent the fact that when a incoming call signal is transmitted to the mobile phone 100, the mobile phone sends out the incoming call alert including ringing and vibrating, wherein the ring of the outdoor ringing and vibration alert mode is much louder than that of the indoor ringing and vibration alert mode similarly. In one exemplary embodiment, the control unit 104 may be a central processing unit (CPU), for example.

The receiver 106 may be disposed in the body 102 of the mobile phone 100, or a portion of the receiver 106 may be disposed in the body 102 and the other portion of the receiver 106 may protrude on the outer side of the body 102. In one embodiment, the receiver 106 may be an antenna, for example. The receiver 106 is electrically connected to the control unit 104 in the body 102 via a wire 112. The receiver 106 can receive an incoming call signal and can transmit the received incoming call signal to the control unit 104 through the wire 112.

Figure 2A:
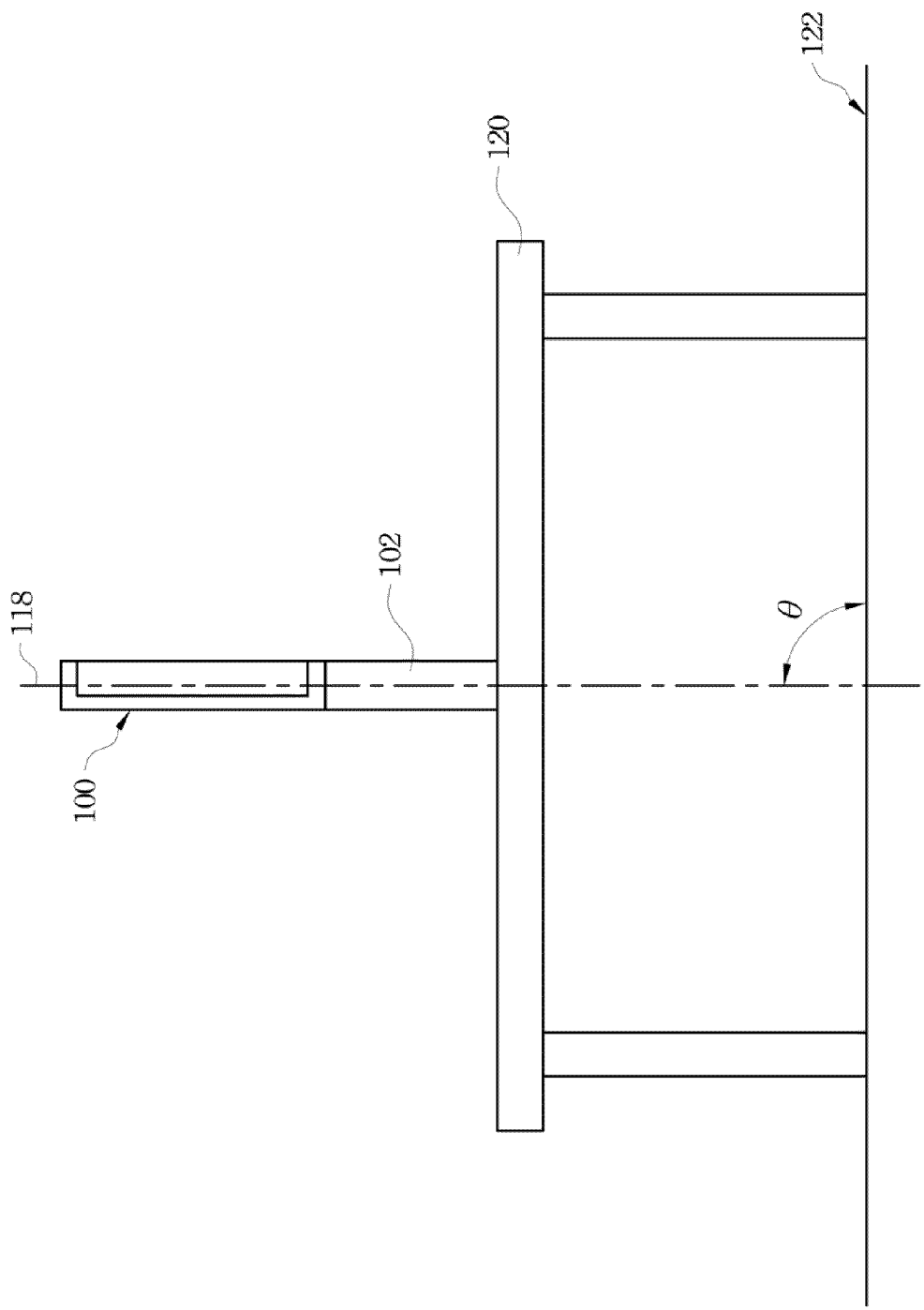
FIG. 2A is a schematic diagram showing a mobile phone in a position state in accordance with a preferred embodiment of the present invention.
Figure 2B:
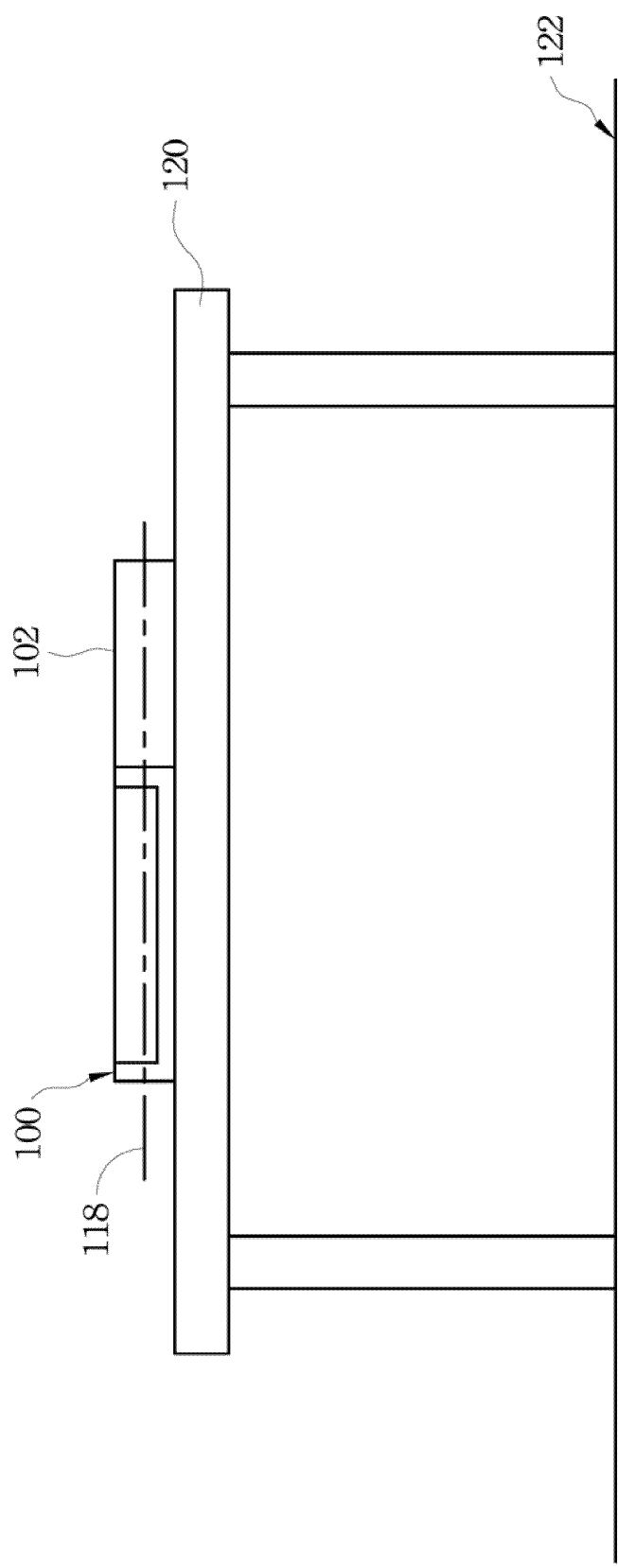
FIG. 2B is a schematic diagram showing a mobile phone in another position state in accordance with a preferred embodiment of the present invention.

The sensor 110 is similarly disposed in the body 102 of the mobile phone 100, wherein the sensor 110 may be electrically connected to the control unit 104 through at least one wire, such as wires 114 and 116. In one embodiment, the sensor 110 may be, for example, a gravity sensor or a motion sensor. Simultaneously refer to FIG. 2A. FIG. 2A is a schematic diagram showing a mobile phone oriented in one direction in accordance with a preferred embodiment of the present invention. The sensor 110 can sense an included angle θ between the lengthwise axis 118 of the mobile phone 100 and a level 122. In the embodiment illustrated in FIG. 2A, the mobile phone 100 is put on a desk 120 in a vertical position state while the desk 120 is put on the level 122, so that the included angle θ between the lengthwise axis 118 of the mobile phone 100 and the level 122 is substantially 90 degrees, and the orientation of the mobile phone 100 is oriented in a vertical direction. Refer to FIG. 2B. FIG. 2B is a schematic diagram showing a mobile phone oriented in another direction in accordance with a preferred embodiment of the present invention. In the embodiment illustrated in FIG. 2B, the mobile phone 100 is put on the desk 120 in a horizontal position state while the desk 120 is put on the level 122, so that the included angle θ between the lengthwise axis 118 of the mobile phone 100 and the level 122 is substantially 0 degree, and the orientation of the mobile phone 100 is oriented in a horizontal direction.

Refer to FIG. 1 again. In the present exemplary embodiment, the sensor 110 is typically in a disable state. When the control unit 104 receives the incoming call signal transmitted by the receiver 106 through the wire 112, the control unit 104 can activate the sensor 110 through the wire 114. Then, the sensor 110 is in an enable state and transmits a sensed signal comprising the data of the included angle θ between the lengthwise axis 118 of the mobile phone 100 and the level 122 to the control unit 104 through the wire 116.

In the present exemplary embodiment, the user can set the incoming call alert mode corresponding to the included angle θ between the lengthwise axis 118 of the mobile phone 100 and the level 122 sensed by the sensor 110 according to the personal need. In one exemplary embodiment, when the detected included angle θ between the lengthwise axis 118 and the level 122 is substantially 0 degrees, the mobile phone 100 is oriented in a horizontal direction. Now, if the mobile phone 100 oriented in the horizontal direction is located indoors, and the incoming call alert cannot be conspicuous. Therefore, the incoming call alert mode of the mobile phone 100 in this orientation may be preset as the quieter alert mode, such as the vibration alert mode, the flashing alert mode, the indoor ringing alert mode and the indoor ringing and vibration alert mode by operating the incoming call alert control module 108 in the control unit 104. When the included angle θ between the lengthwise axis 118 of the mobile phone 100 and the level 122 is substantially 90 degrees, the mobile phone 100 is oriented in a vertical direction. Now, if the mobile phone 100 oriented in the vertical direction is disposed in a pocket or a bag of the user, and the user is in motion and may be in the outdoors, the incoming call alert needs to attract the user's attention. Therefore, the incoming call alert mode of the mobile phone 100 in this orientation may be correspondingly preset as the alert mode, which is easier to attract the user's attention, such as the outdoor ringing alert mode and the outdoor, ringing and vibration alert mode by operating the incoming call alert control module 108 in the control unit 104.

Figure 3:
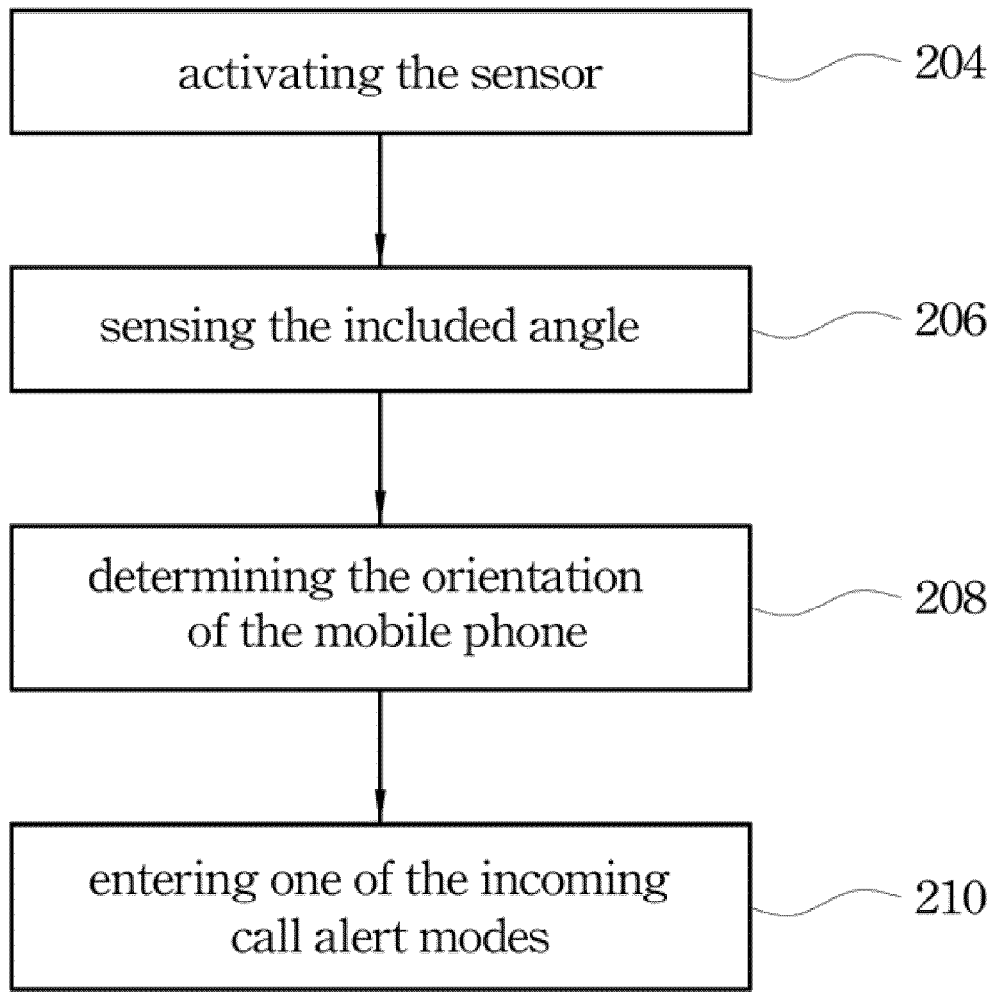
FIG. 3 is a flowchart illustrating a method for automatically switching between a plurality of incoming call alert modes of a mobile phone in accordance with a preferred embodiment of the present invention.

Simultaneously refer to FIG. 3 and FIG. 1. FIG. 3 is a flowchart illustrating a method for automatically switching between a plurality of incoming call alert modes of a mobile phone in accordance with a preferred embodiment of the present invention. In one exemplary embodiment, the method for automatically switching between a plurality of incoming call alert modes of a mobile phone can be implemented by the mobile phone 100 illustrated in FIG. 1. First, such as illustrated in step 204, when the control unit 104 of the mobile phone 100 receives the incoming call signal transmitted by the receiver 106, the control unit 104 activates the sensor 110 through the wire 114. Next, referring to FIGS. 2A and 2B simultaneously, such as illustrated in step 206, the activated sensor 110 in the mobile phone 100 senses the included angle θ between the lengthwise axis 118 of the mobile phone 100 and the level 122. Further, step 206 further includes transmitting the included angle θ between the lengthwise axis 118 of the mobile phone 100 and the level 122 sensed by the sensor 110 to the control unit 104 through the wire 116.

Then, such as illustrated in step 208, the control unit 104 can determine the orientation of the mobile phone 100 according to the included angle θ. The orientation of the mobile phone 100 includes various orientations, which are preset in the product or which are set by the user in the control unit 104, such as oriented in the vertical direction as shown in FIG. 2A or oriented in the horizontal direction as shown in FIG. 2B.

Presently, the incoming call alert modes corresponding to the included angle θ between the lengthwise axis 118 of the mobile phone 100 and the level 122 are preset in the production of the mobile phone 100 or are set by the user according to the personal need. Therefore, such as illustrated in step 210, the incoming call alert control module 108 in the control unit 104 of the mobile phone 100 enters one of the incoming call alert modes according to the a determination of the orientation of the mobile phone 100 obtained in the determination step 208.

For example, such as shown in FIG. 2A, when the included angle θ between the lengthwise axis 118 of the mobile phone 100 and the level 122 is substantially 90 degrees, the determination is that the mobile phone 100 is oriented in a vertical direction, and the mobile phone 100 enters one alert mode of the incoming call alert modes, which can attract the user's attention, such as the outdoor ringing alert mode or the outdoor ringing and vibration alert mode. In another embodiment, referring to FIG. 2B, when the included angle θ between the lengthwise axis 118 of the mobile phone 100 and the level 122 is substantially 0 degree, the determination is that the mobile phone is oriented in a horizontal direction, and the mobile phone 100 enters one inconspicuous alert mode of the incoming call alert modes, such as the vibration alert mode, the indoor ringing alert mode, the flashing alert mode and the indoor ringing and vibration alert mode.

According to the aforementioned embodiments, one advantage of the present invention is that a mobile phone is equipped with a sensor The sensor can sense an included angle between a lengthwise axis of the mobile phone and a level, so that a control unit of the mobile phone can automatically enter one of the incoming call alert modes according to the detected included angle. Accordingly, it can prevent the user in the outdoors from missing the important incoming call. Furthermore, it can prevent the mobile phone from ringing a mistimed incoming call alert in a quiet occasion due to the forgetting of switching the incoming call alert of the mobile phone.

According to the aforementioned embodiments, another advantage of the present invention is that a method for automatically switching a incoming call alert of a mobile phone can use a sensor of the mobile phone to sense an included angle between a lengthwise axis the mobile phone and a level, can use a control unit of the mobile phone to determine a position state of the mobile phone according to the included angle, and can automatically switch the incoming call alert mode of the mobile phone according to the determined position state of the mobile phone. Therefore, the incoming call alert of the mobile phone can meet the requirement of the user, and the user does not need to switch the incoming call alert mode according to the occasion by oneself, thereby greatly increasing the practicality and the convenience of the mobile phone.

As is understood by a person skilled in the art, the foregoing preferred embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A mobile phone, comprising:
   a body;
   a control unit disposed in the body, wherein the control unit includes an incoming call alert control module providing a plurality of incoming call alert modes, and one of the incoming call alert modes comprises an outdoor ringing alert mode, an indoor ringing alert mode, a vibration alert mode, a silent alert mode, a flashing alert mode, an indoor ringing and vibration alert mode, or an outdoor ringing and vibration alert mode;
   a receiver suitable for receiving an incoming call signal and transmitting the incoming call signal to the control unit, wherein the receiver is disposed in the body and is electrically connected to the control unit; and
   a sensor suitable for sensing an included angle between a lengthwise axis of the mobile phone and a level, and for transmitting a signal of the detected included angle to the control unit, wherein the sensor is disposed in the body and is electrically connected to the control unit, wherein
   when the control unit receives the incoming call signal, the control unit activates the sensor,
   when the control unit receives the signal of the detected included angle, the incoming call alert control module enters one of the incoming call alert modes according to the detected included angle, and
   when the included angle between the lengthwise axis of the mobile phone and the level is substantially 90 degrees, the incoming call alert control module enters the outdoor ringing alert mode or the outdoor ringing and vibration alert mode of the incoming call alert modes.

2. The mobile phone according to claim 1, wherein the sensor is a gravity sensor or a motion sensor.

3. A mobile phone, comprising:
   a body;

a control unit disposed in the body, wherein the control unit includes an incoming call alert control module providing a plurality of incoming call alert modes, and one of the incoming call alert modes comprises an outdoor ringing alert mode, an indoor ringing alert mode, a vibration alert mode, a silent alert mode, a flashing alert mode, an indoor ringing and vibration alert mode, or an outdoor ringing and vibration alert mode;

a receiver suitable for receiving an incoming call signal and transmitting the incoming call signal to the control unit, wherein the receiver is disposed in the body and is electrically connected to the control unit; and a sensor suitable for sensing an included angle between a lengthwise axis of the mobile phone and a level, and for transmitting a signal of the detected included angle to the control unit, wherein the sensor is disposed in the body and is electrically connected to the control unit, wherein when the control unit receives the incoming call signal, the control unit activates the sensor, when the control unit receives the signal of the detected included angle, the incoming call alert control module enters one of the incoming call alert modes according to the detected included angle, and when the included angle between the lengthwise axis of the mobile phone and the level is substantially 0 degree, the incoming call alert control module enters the vibration alert mode, the indoor ringing alert mode, the flashing alert mode or the indoor ringing and vibration alert mode of the incoming call alert modes.

4. The mobile phone according to claim 3, wherein the sensor is a gravity sensor or a motion sensor.

5. A method for automatically switching between a plurality of incoming call alert modes of a mobile phone, wherein the mobile phone includes a sensor and provides the plurality of incoming call alert modes, one of the incoming call alert modes comprises an outdoor ringing alert mode, an indoor ringing alert mode, a vibration alert mode, a silent alert mode, a flashing alert mode, an indoor ringing and vibration alert mode, or an outdoor ringing and vibration alert mode, and the method comprises:

activating the sensor when an incoming call signal is received;

sensing an included angle between a lengthwise axis of the mobile phone and a level;

determining orientation of the mobile phone according to the detected included angle, wherein when the detected included angle between the lengthwise axis of the mobile phone and the level is substantially 90 degrees, the determination is that the mobile phone is oriented in a vertical direction; and the mobile phone entering one of the incoming call alert modes according to a determination of the orientation of the mobile phone.

6. The method for automatically switching between the plurality of incoming call alert modes of the mobile phone according to claim 5, wherein the step of the mobile phone entering one of the incoming call alert modes comprises the mobile phone entering the outdoor ringing alert mode.

7. The method for automatically switching between the plurality of incoming call alert modes of the mobile phone according to claim 5, wherein the step of the mobile phone entering one of the incoming call alert modes comprises the mobile phone entering the outdoor ringing and vibration alert mode.

8. The method for automatically switching between the plurality of incoming call alert modes of the mobile phone according to claim 5, wherein when the detected included angle between the lengthwise axis of the mobile phone and the level is substantially 0 degree, the determination is that the mobile phone is oriented in a horizontal direction.

9. The method for automatically switching between the plurality of incoming call alert modes of the mobile phone according to claim 8, wherein the step of the mobile phone entering one of the incoming call alert modes comprises the mobile phone entering the vibration alert mode.

10. The method for automatically switching between the plurality of incoming call alert modes of the mobile phone according to claim 8, wherein the step of the mobile phone entering one of the incoming call alert modes comprises the mobile phone entering the indoor ringing alert mode.

11. The method for automatically switching between the plurality of incoming call alert modes of the mobile phone according to claim 8, wherein the step of the mobile phone entering one of the incoming call alert modes comprises the mobile phone entering the flashing alert mode.

12. The method for automatically switching between the plurality of incoming call alert modes of the mobile phone according to claim 8, wherein the step of the mobile phone entering one of the incoming call alert modes comprises the mobile phone entering the indoor ringing and vibration alert mode.

13. The method for automatically switching between the plurality of incoming call alert modes of the mobile phone according to claim 5, wherein the sensor is a gravity sensor or a motion sensor.

* * * * *